(12) United States Patent
Chinthu et al.

(10) Patent No.: US 12,525,879 B2
(45) Date of Patent: Jan. 13, 2026

(54) CHARGE PUMP CIRCUIT WITH PARALLEL CHARGE PUMP STAGES

(71) Applicant: GlobalFoundries U.S. Inc., Malta, NY (US)

(72) Inventors: Siva Kumar Chinthu, Bangalore (IN); Palle Sundar Veerendranath, Andhra Pradesh (IN); Siva Kumar Anala, Bangalore (IN); Mitra Sen Singh, Sonbhadra (IN)

(73) Assignee: GlobalFoundries U.S. Inc., Malta, NY (US)

( * ) Notice: Subject to any disclaimer, the term of this patent is extended or adjusted under 35 U.S.C. 154(b) by 48 days.

(21) Appl. No.: 18/617,718

(22) Filed: Mar. 27, 2024

(65) Prior Publication Data

US 2025/0309763 A1 Oct. 2, 2025

(51) Int. Cl.
*H02M 3/07* (2006.01)
(52) U.S. Cl.
CPC .................................. *H02M 3/077* (2021.05)
(58) Field of Classification Search
CPC ........................................................ H02M 3/077
See application file for complete search history.

(56) References Cited

U.S. PATENT DOCUMENTS

| 5,493,249 A | 2/1996 | Manning | |
|---|---|---|---|
| 7,173,478 B2* | 2/2007 | Chun | H02M 1/088 327/536 |
| 7,683,700 B2* | 3/2010 | Huynh | H02M 3/073 327/536 |
| 8,493,134 B2* | 7/2013 | Hao | G06F 1/06 327/536 |
| 8,755,242 B2* | 6/2014 | Lee | H02M 3/07 365/226 |
| 10,199,931 B2* | 2/2019 | Wei | G05F 1/10 |
| 11,569,738 B1 | 1/2023 | Chinthu | |
| 12,206,325 B2* | 1/2025 | Nguyen | H02M 3/07 |
| 2010/0327959 A1 | 12/2010 | Lee | |

OTHER PUBLICATIONS

Pelliconi et al., "Power Efficient Charge Pump in Deep Submicron Standard CMOS Technology," IEEE Journal of Solid-State Circuits, vol. 38, No. 6, Jun. 2003, pp. 1068-1071.

* cited by examiner

*Primary Examiner* — Jeffrey S Zweizig
(74) *Attorney, Agent, or Firm* — David Cain; Hoffman Warnick LLC

(57) ABSTRACT

Disclosed is a charge pump circuit including: a single primary charge pump stage or multiple primary charge pump stages connected in series; a pass transistor connected between an output node of the primary charge pump stage (or of the last of the multiple primary charge pump stages, if applicable) and an output terminal; and a supplementary charge pump stage. The supplementary charge pump stage receives the same input voltage as the primary charge pump stage (or the same input voltage as the last of the multiple primary charge pump stages, if applicable) and controls the gate of the pass transistor to reduce ripple at the output terminal. A capacitive load can also be connected to the output terminal to reduce ripple and the size of the capacitive load can be selected to achieve a desired balance between the amount of ripple and circuit size.

19 Claims, 9 Drawing Sheets (e.g., n=4 or 8 and delay = a ¼ cycle (T) shift)

Single charge pump stage, Vout ripple=Vouth-Voutl (e.g., ~330mV), and set capacitive load (CL) (e.g., 160 picoFarads (pF))

Multiple charge pump stages in parallel, clock generation circuit 105A, fVout ripple=fVouth-fVoutl (e.g., ~25mV), and set CL (e.g., 160pF)

Multiple charge pump stages in parallel, clock generation circuit 105B, fVout ripple=fVouth-fVoutl (e.g., ~43mV), and set CL (e.g., 160pF)

Multiple charge pump stages in parallel, clock generation circuit 105A or 105B, fVout ripple=fVouth-fVoutl (e.g., ~330mV), and reduced CL (e.g., 16pF)

CHARGE PUMP CIRCUIT WITH PARALLEL CHARGE PUMP STAGES

BACKGROUND

The present disclosure relates to charge pump circuits and, more particularly, to embodiments of a charge pump circuit configured for reduced output voltage ripple and/or area.

A charge pump circuit is a circuit that converts a direct current (DC) power source (i.e., an input voltage (Vin)) to a larger DC power source (e.g., to an output voltage (Vout) that is greater than Vin). A charge pump circuit with a single stage can convert a Vin that is equal to a positive supply voltage (VDD) to a Vout that is approximately 2*VDD or somewhat less when an electrical load is connected to the output to drive current. For example, if Vin is 1.8V, then Vout could be approximately 3.6V or reduced to, for example, 3.0V due to a resistive load connected to the output. Vout may, however, exhibit significant ripple. Ripple refers to periodic variation exhibited by a DC voltage and this variation can impair performance of devices connected to receive Vout. Typically, Vout ripple is reduced by increasing the capacitance load (CL) connected to the output of the charge pump circuit. However, adding capacitance can significantly increase circuit area.

SUMMARY

Disclosed herein are embodiments of a charge pump circuit structure. The structure can include an input terminal and an output terminal. The structure can further include at least two charge pump stages connected in parallel between the input terminal and the output terminal. These charge pump stages can include at least a first charge pump stage and a second charge pump stage. The first charge pump stage can be connected to receive a first clock signal and an inverted first clock signal. The second charge pump stage can be connected to receive a second clock signal and an inverted second clock signal. Additionally, the second clock signal can have the same clock period as the first clock signal but can be delayed relative to the first clock signal.

Embodiments of charge pump circuit structure disclosed herein can include an input terminal and an output terminal. The structure can further include multiple charge pump stages, which are connected in parallel between the input terminal and the output terminal. These charge pump stages can include at least a first charge pump stage and a last charge pump stage. The first charge pump stage can be connected to receive a first clock signal and an inverted first clock signal. Each additional charge pump state up to and including the last charge pump stage are connected to receive progressively delayed clock and inverted clock signals with a same clock period as the first clock signal.

Other embodiments of a charge pump circuit structure disclosed herein can include an input terminal and an output terminal. The structure can further include multiple charge pump stages connected in parallel between the input terminal and the output terminal. Half of the charge pump stages can be connected to receive a first clock signal and an inverted first clock. A different half of the charge pump stages can be connected to receive a second clock signal and an inverted second clock signal. The second clock signal can have the same clock period as the first clock signal but can be delayed relative to the first clock signal.

It should be noted that all aspects, examples, and features of disclosed embodiments mentioned in the summary above can be combined in any technically possible way. That is, two or more aspects of any of the disclosed embodiments, including those described in this summary section, may be combined to form implementations not specifically described herein. The details of one or more implementations are set forth in the accompanying drawings and the description below. Other features, objects and advantages will be apparent from the description and drawings, and from the claims.

BRIEF DESCRIPTION OF THE DRAWINGS

The present disclosure will be better understood from the following detailed description with reference to the drawings, which are not necessarily drawn to scale and in which.

DETAILED DESCRIPTION

Figure 1:
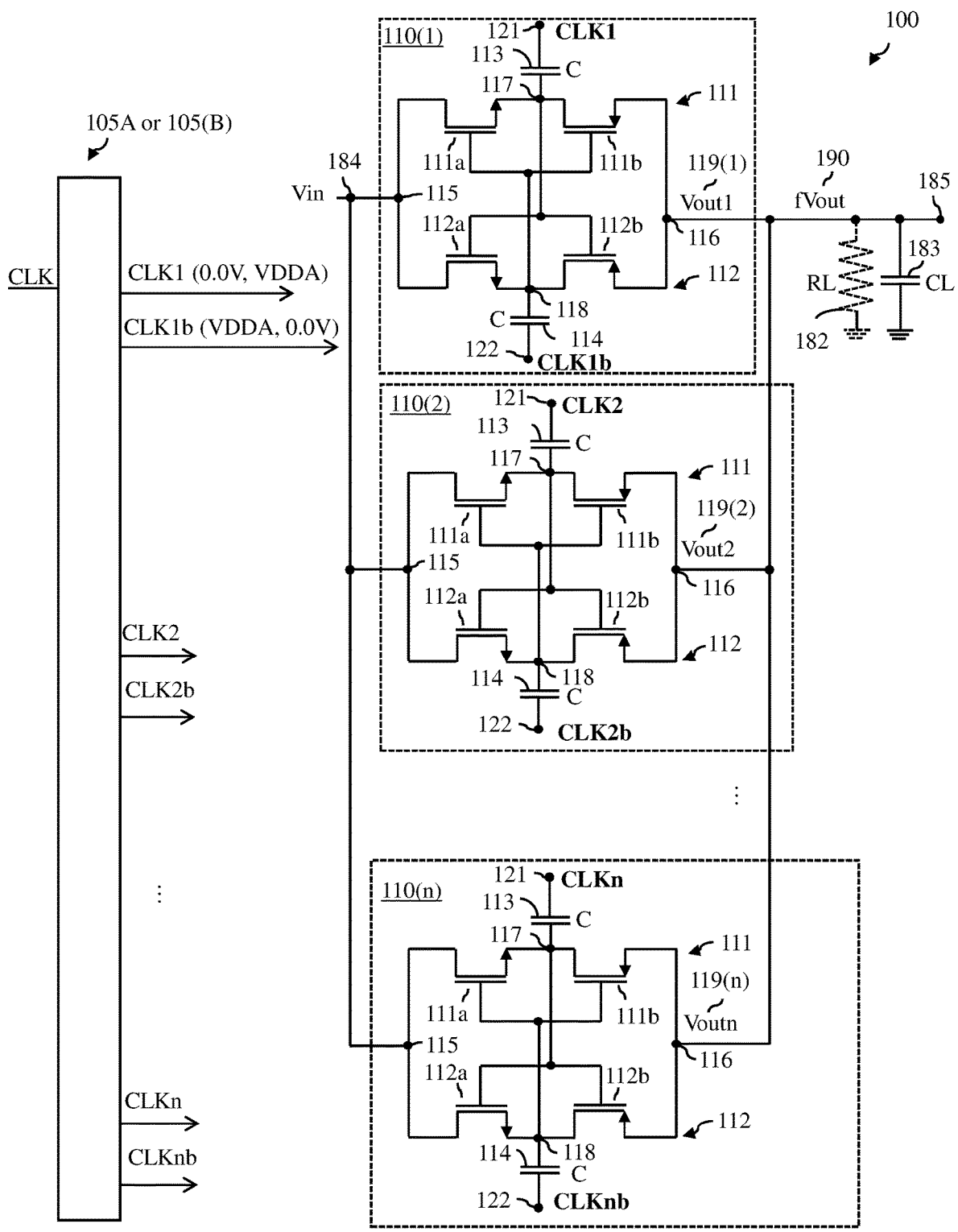
FIG. 1 is a schematic diagram illustrating disclosed embodiments of a charge pump circuit structure.

As mentioned above, a charge pump circuit is a circuit that converts a direct current (DC) power source (i.e., an input voltage (Vin)) to a larger DC power source (e.g., to an output voltage (Vout) that is greater than Vin). A charge pump circuit with a single stage can convert a Vin that is equal to a positive supply voltage (VDD) to a Vout that is approximately 2*VDD or somewhat less when an electrical load is connected to the output to drive current. For example, if Vin is 1.8V, then Vout could be approximately 3.6V or reduced to, for example, 3.0V due to a resistive load connected to the output. Vout may, however, exhibit significant ripple. Ripple refers to periodic variation exhibited by a DC voltage and this variation can negatively impair performance of devices connected to receive Vout. Typically, Vout ripple is reduced by increasing the capacitance load (CL) at the output of the charge pump. However, adding capacitance can significantly increase circuit area.

In view of the foregoing, disclosed herein are embodiments of a charge pump circuit including charge pump stages connected in parallel between an input terminal and an output terminal. Each charge pump stage can have a conventional charge pump stage structure including a pair of capacitors. The capacitors in all charge pump stages can be equal-size capacitors. Additionally, if the charge pump circuit with multiple charge pump stages connected in parallel supplants a charge pump circuit with a single charge pump stage (e.g., to reduce output voltage ripple), the total capacitance of all capacitors across all of the charge pump stages should be equal to the total capacitance of the pair of capacitors in the single charge pump stage. Each charge pump stage can further be controlled by a pair of clock signals (including a clock signal and an inverted clock signal) connected to the pair of capacitors, respectively. However, the pairs of clock signals received by each charge pump stage can be essentially the same (e.g., with the same clock period and same magnitude) except that one or more pairs of clock signals received by one or more of the charge pump stages can be delayed. With this configuration, the output voltage at the output node of each charge pump stage will exhibit ripple. However, when all output voltages from all charge pump stages are applied to the output terminal of the charge pump circuit, the final output voltage exhibits significantly reduced ripple due to the combination of delayed and un-delayed pairs of clock signals (each including a clock signal and an inverted clock signal) that control the different charge pump stages. The circuit can further include a capacitive load connected to the output terminal, also to reduce output voltage ripple. Thus, during design, the size of the capacitive load can be selected to achieve a desired balance between the amount of output voltage ripple and the overall size of the circuit (which increases or decreases as a function of the load capacitance).

More particularly, referring to FIG. 1, disclosed herein are embodiments of a structure and, particularly, of a charge pump circuit 100 (hereinafter referred to as circuit 100) including an input terminal 184, an output terminal 185, multiple charge pump (CP) stages (e.g., 110(1)-110(n)) connected in parallel between input terminal 184 and output terminal 185.

Circuit 100 can further include a capacitive load (CL) 183, which is electrically connected to an output terminal 185. Those skilled in the art will recognize that such a CL can be added to reduced ripple of a final output voltage (fVout) at output terminal 185. Optionally, circuit 100 can also include a resistive load (RL) 182, which is electrically connected to output terminal 185 for driving current. While RL 182 improves drive current, it may result in a small reduction in fVout at output terminal 185 (e.g., of 0.6V). For example, fVout 190 at output terminal 185 may be 3.6V without a RL 182 and only 3.0V with a RL 182.

The total number (n) of CP stages 110(1)-110(n) can be any number of two or more CP stages. Each CP stage 110(1)-110(n) can include an input node 115 electrically connected to input terminal 184 and an output node 116 electrically connected to output terminal 185, and a pair of cross-coupled inverters 111 and 112 connected between input node 115 and output node 116. One inverter 111 can include an N-channel field effect transistor (NFET) 111a and a P-channel field effect transistor (PFET) 111b connected in series between input node 115 and output node 116. Another inverter 112 can similarly include an NFET 112a and a PFET 112b connected in series between input node 115 and output node 116. An intermediate node 117 at the junction between NFET 111a and PFET 111b (e.g., on an interconnect electrically connecting NFET 111a to PFET 111b) can be electrically connected to the gates of NFET 112a and PFET 112b. Similarly, an intermediate node 118 at the junction between NFET 112a and PFET 112b (e.g., on an interconnect electrically connecting NFET 112a and PFET 112b) can be electrically connected to the gates of NFET 111a and PFET 111b.

Each CP stage 110(1)-110(n) can further include a pair of capacitors 113 and 114 connected between the clock signal nodes 121 and 122 and the intermediate nodes 117 and 118, respectively. That is, capacitor 113 can include conductive plates, which are connected to clock signal node 121 and intermediate node 117, respectively, and which are separated from each other by a capacitor dielectric. Capacitor 114 can similarly include conductive plates, which are connected to clock signal node 122 and intermediate node 118, respectively, and which are also separated from each other by a capacitor dielectric. Capacitors 113 and 114 can be equal-size capacitors across all charge pump stages 110(1)-110(n). Additionally, if circuit 100 with multiple charge pump stages 110(1)-110(n) connected in parallel is being designed to replace a charge pump circuit with a single charge pump stage (e.g., to reduce output voltage ripple), the total capacitance of all capacitors across all charge pump stages should be equal to the total capacitance of the pair of capacitors in the single charge pump stage. For example, if each capacitor of a pair of capacitors in a single charge pump stage of a charge pump circuit has a capacitance (c), then a replacement charge pump circuit (according to the disclosed embodiments) could include: four parallel charge pump stages connected in parallel with each capacitor of each pair of capacitors in each charge pump stage having a capacitance (C) equal to ¼*c; eight parallel charge pump stages connected in parallel with each capacitor of each pair of capacitors in each charge pump stage having a capacitance (C) equal to ⅛*c; and so on.

Input terminal 184 (and thereby each input node 115 of each CP stage 110(1)-110(n)) can be connected to receive a direct current (DC) power source (i.e., an input voltage (Vin)). Vin can, for example, be at the level of a relatively low positive supply voltage (VDDA). This relatively low VDDA can, for example, correspond to the maximum voltage ratings of the devices used (e.g., of NFET 111a, PFET 111b, NFET 112a, and PFET 112b). For example, if NFET 111a, PFET 111b, NFET 112a, and PFET 112b are all rated as 1.8 volt (V)-FETs (e.g., with a maximum gate-source voltage (VGS) rating of 1.8V, a maximum gate-drain voltage (VDS) of 1.8V, and a maximum source-drain voltage (VSD) rating of 1.8V), then VDDA could be 1.8 volts (V). If NFET 111a, PFET 111b, NFET 112a, and PFET 112b are all 1.5V-FETs, then VDDA could be 1.5V, and so on.

Each CP stage 110(1)-110(n) can also include a pair of clock signal nodes 121 and 122. Clock signal nodes 121 and 122 can be electrically connected to receive and controlled by a corresponding pair of clock signals (including a clock signal and an inverted clock signal) from a clock generation circuit 105A or 105B. For example, clock signal nodes 121 and 122 of a first CP stage 110(1) can be connected to receive a first clock signal (CLK1) and an inverted first clock (CLK1b); clock signal nodes 121 and 122 of a second CP stage 110(2) can be connected to receive a second clock signal (CLK2) and an inverted second clock signal (CLK2b); and so on with clock signal nodes 121 and 122 of a last CP stage 110(n) being connected to receive a last clock signal (CLKn) and inverted last clock signal (CLKnb). As discussed in greater detail below, each pair of clock signals (i.e., CLK1 and CLK1b, CLK2 and CLK2b, . . . . CLKn and CLKnb) can be essentially the same (e.g., with the same magnitude and same clock period). That is, each clock signal can switch between 0.0V and VDDA and each inverted clock signal can switch between VDDA and 0.0V. Furthermore, each clock signal and inverted clock signal can have the same specific clock period (T) (i.e., within each clock signal and inverted clock signal, the amount of time between rising edges (or between falling edges) is the same). Thus, in a given pair of clock signals, as the clock signal switches from 0.0V to VDDA, the inverted clock signal switches from VDDA to 0.0V and vice versa. However, in the disclosed embodiments, one or more pairs of clock signals received by and controlling one or more of the charge pump stages 110(1)-110(n) can be delayed, as discussed below.

Specifically, during charge pump circuit design, a total number (n) of charge pump stages 110(1)-110(n) and a combination of delayed and un-delayed pairs of clock signals (each including a clock signal and an inverted clock signal) generated by clock signal generation circuit 105A or 105B and output to charge pump stages 110(1)-110(n), respectively, can be predetermined to, for example, achieve some desired amount of reduction in ripple in a final output voltage (fVout) at output terminal 185 of circuit 100. It should be understood that the configuration of clock generation circuit (e.g., 105A or 105B) will depend on the total number (n) of charge pump stages 110(1)-110(n) and the above-mentioned combination of delayed and un-delayed pairs of clock signals.

Figure 2A:
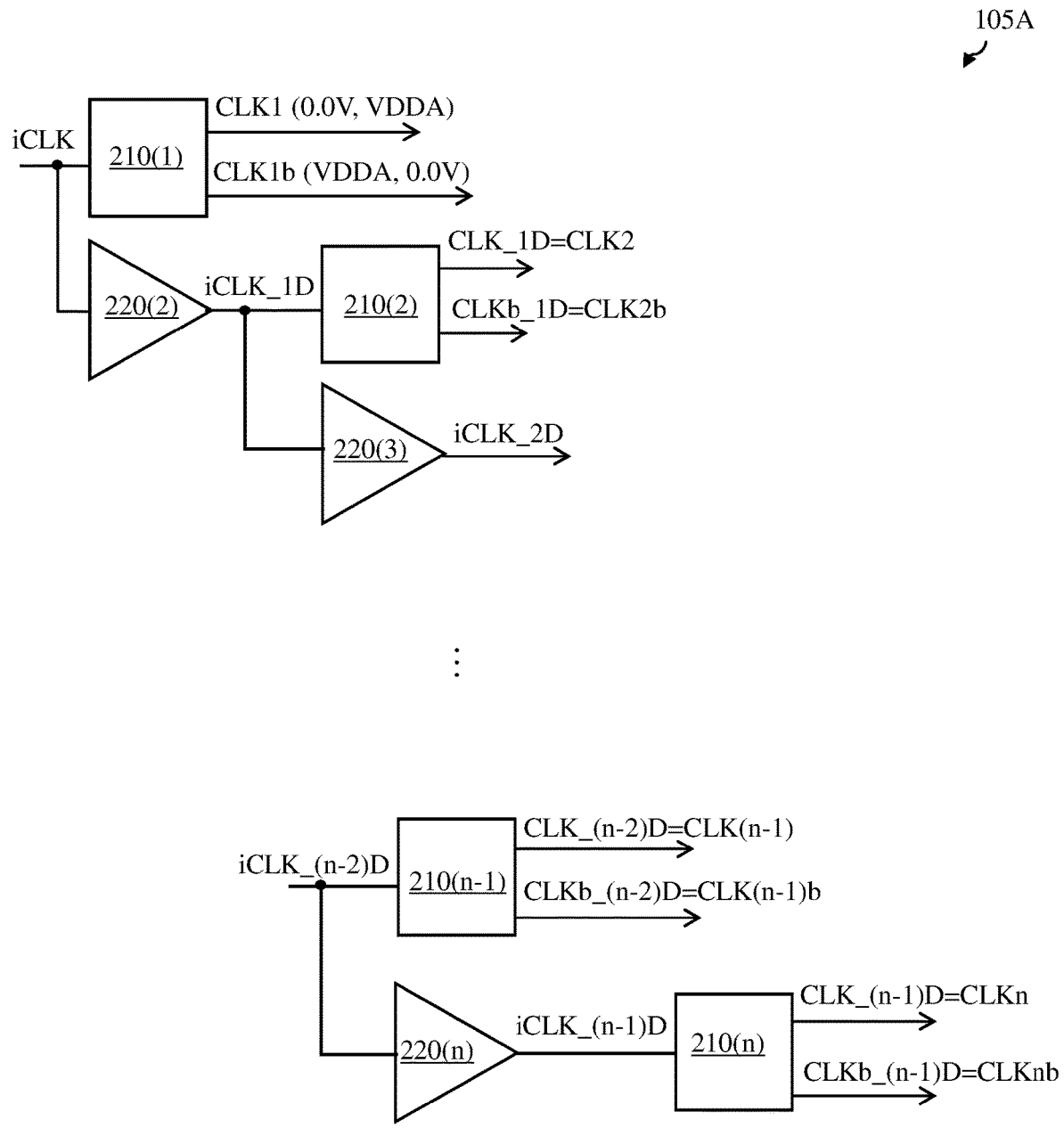
FIG. 2A is a schematic diagram illustrating an example of a clock generation circuit that can be incorporated into the charge pump circuit structure of FIG. 1.
Figure 2B:
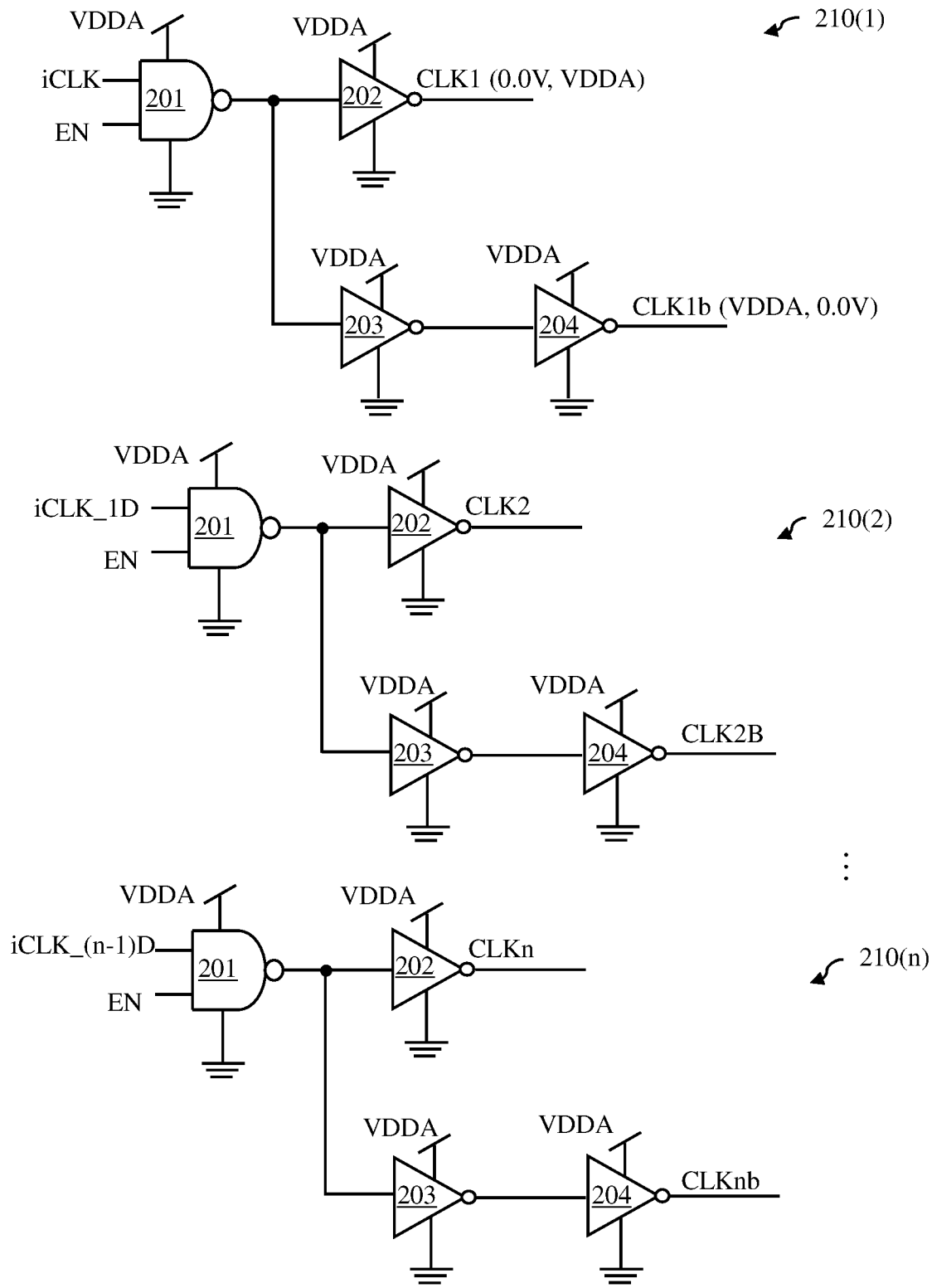
FIG. 2B is a schematic diagram illustrating examples of clock drivers that can be incorporated into the clock generation circuit of FIG. 2A.
Figure 2C:
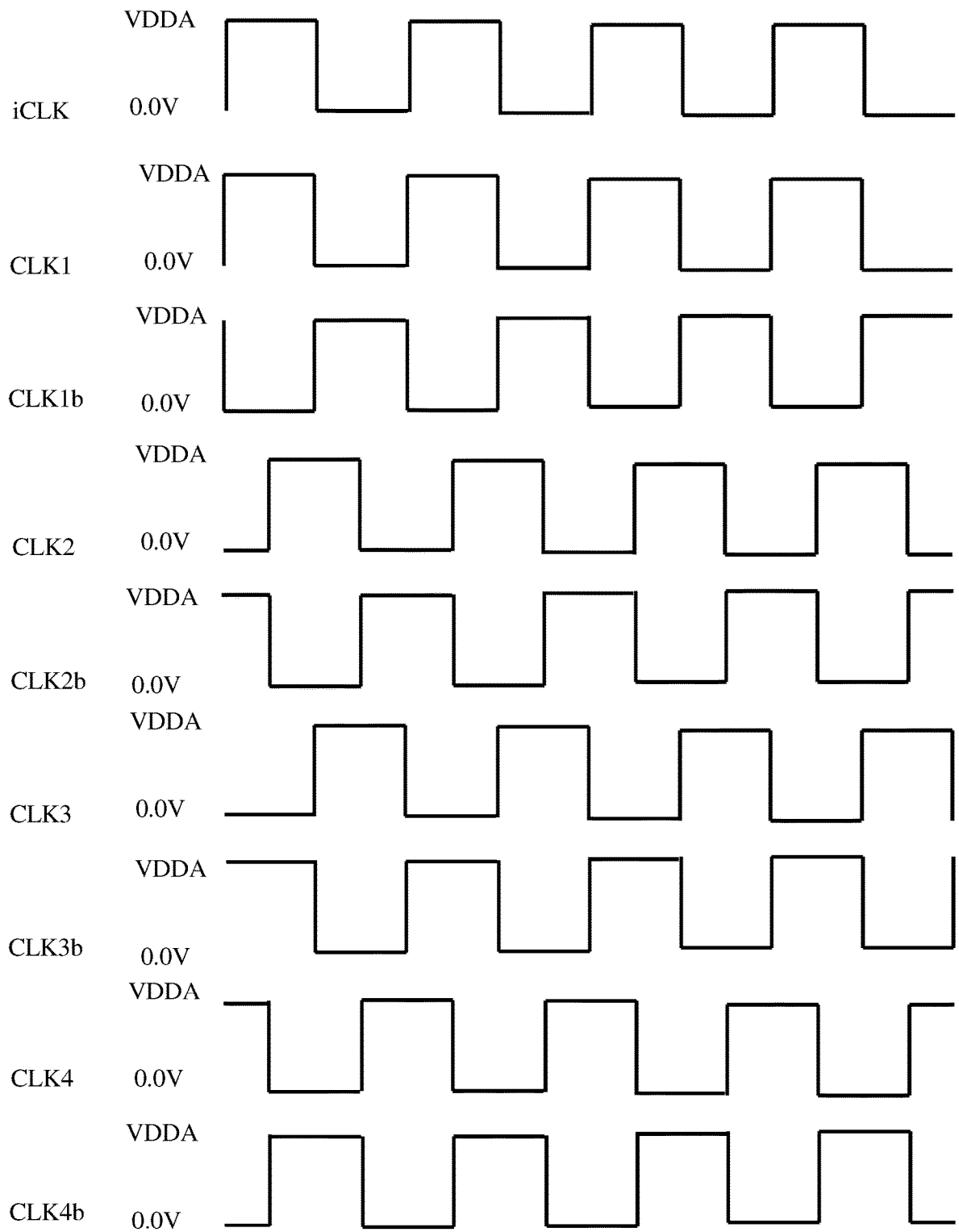
FIG. 2C is a waveform diagram illustrating clock signals generated by the clock generation circuit of FIG. 2A.

In some embodiments (as illustrated in FIGS. 2A-2C and discussed in greater detail below), the combination of delayed and un-delayed pairs of clock signals (each including a clock signal and an inverted clock signal) for controlling charge pump stages 110(1)-110(n) of circuit 100 of FIG. 1 may be relatively complex. For example, first CP stage 110(1) can be electrically connected to receive an un-delayed pair of clock signals including a first clock signal (CLK1) at clock signal node 121 and an inverted first clock signal (CLK1b) at clock signal node 122. Each additional charge pump stage (e.g., second CP stage 110(2) to last CP stage 110n) can be electrically connected to receive delayed pairs of clock signals and, particularly, progressively delayed clock and inverted clock signals. The progressively delayed clock and inverted clock signals can be essentially the same as CLK1 and CLK1b (e.g., same magnitude, same clock period, etc.) except delayed by a specific fraction of one clock period (T). In one example, the total number (n) of charge pump stages 110(1)-110(n) can be a multiple of four (e.g., n=4, 8, 12, etc.). In this case, the progressively delayed clock and inverted clock signals received by each additional charge pump stage (e.g., in order from second charge pump stage 110(2) to last charge pump stage 110(n)) can be delayed by one quarter of one clock period (i.e., by ¼*T). Thus, CLK2 and CLK2b can delayed relative to CLK1 and CLK1b, respectively, by ¼*T, CLK3 and CLK3b can be delayed relative to CLK1 and CLK1b by ½*T, and so on. In another example, the total number (n) of the charge pump stages 110(1)-110(n) in circuit 100 can be a multiple of ten (e.g., n=10, 20, etc.). In this case, the progressively delayed clock and inverted clock signals received by each additional charge pump stage (e.g., in order from second charge pump stage 110(2) to last charge pump stage 110(n)) can be delayed by one tenth of one clock period (i.e., by ⅒*T). Thus, CLK2 and CLK2b can be delayed relative to CLK1 and CLK1b, respectively, by ⅒*T, CLK3 and CLK3b can be delayed relative to CLK1 and CLK1b by ⅕*T, and so on.

Figure 3A:
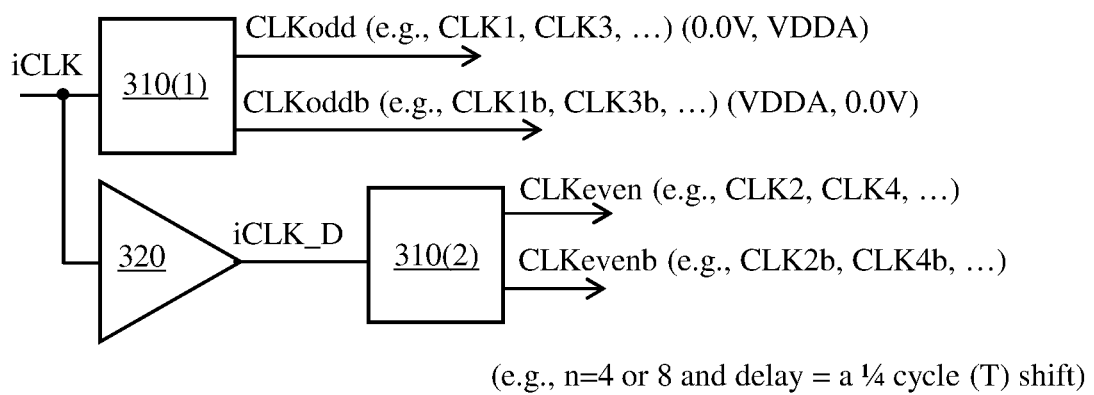
FIG. 3A is a schematic diagram illustrating another example of a clock generation circuit that can be incorporated into the charge pump circuit structure of FIG. 1.
Figure 3B:
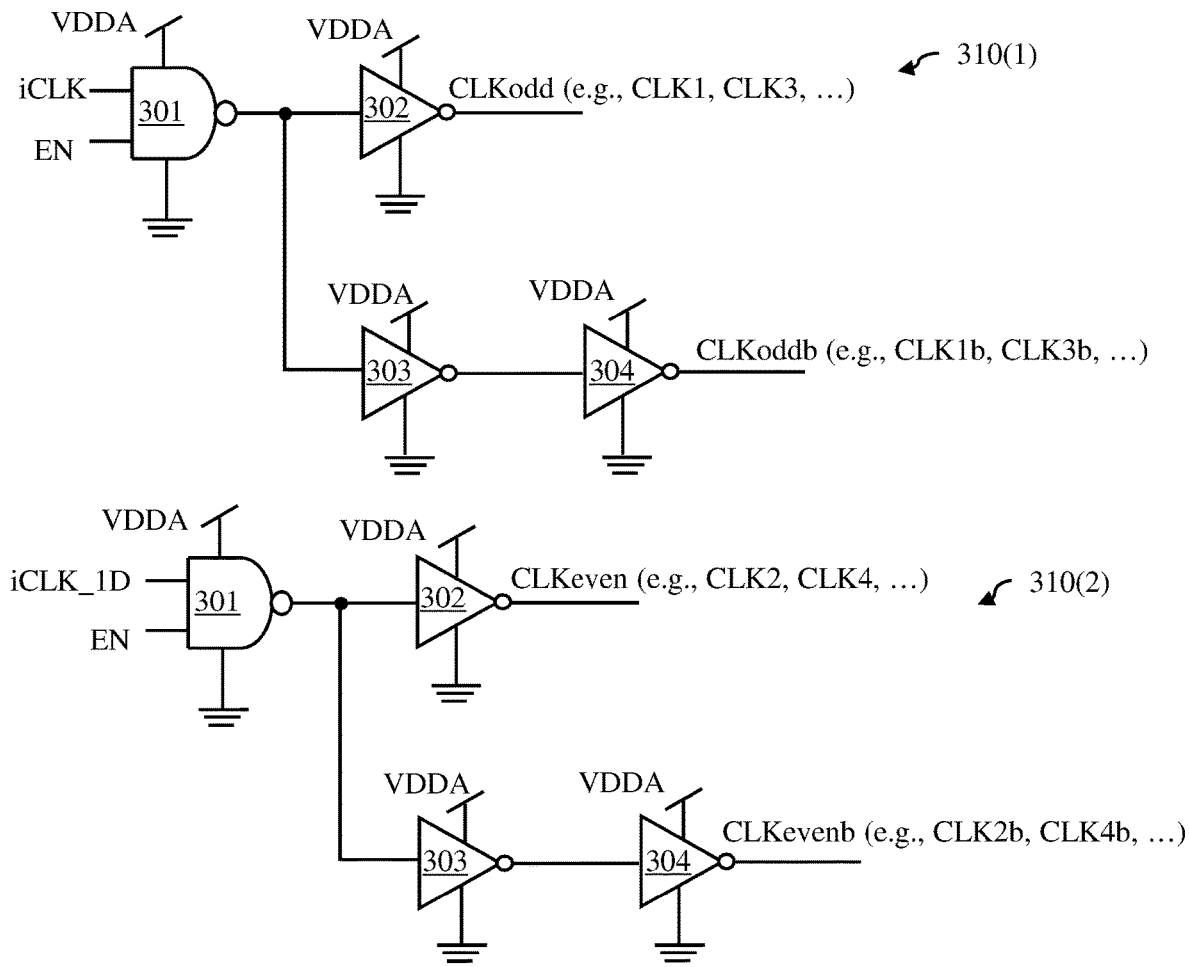
FIG. 3B is a schematic diagram illustrating examples of clock drivers that can be incorporated into the clock generation circuit of FIG. 3A.
Figure 3C:
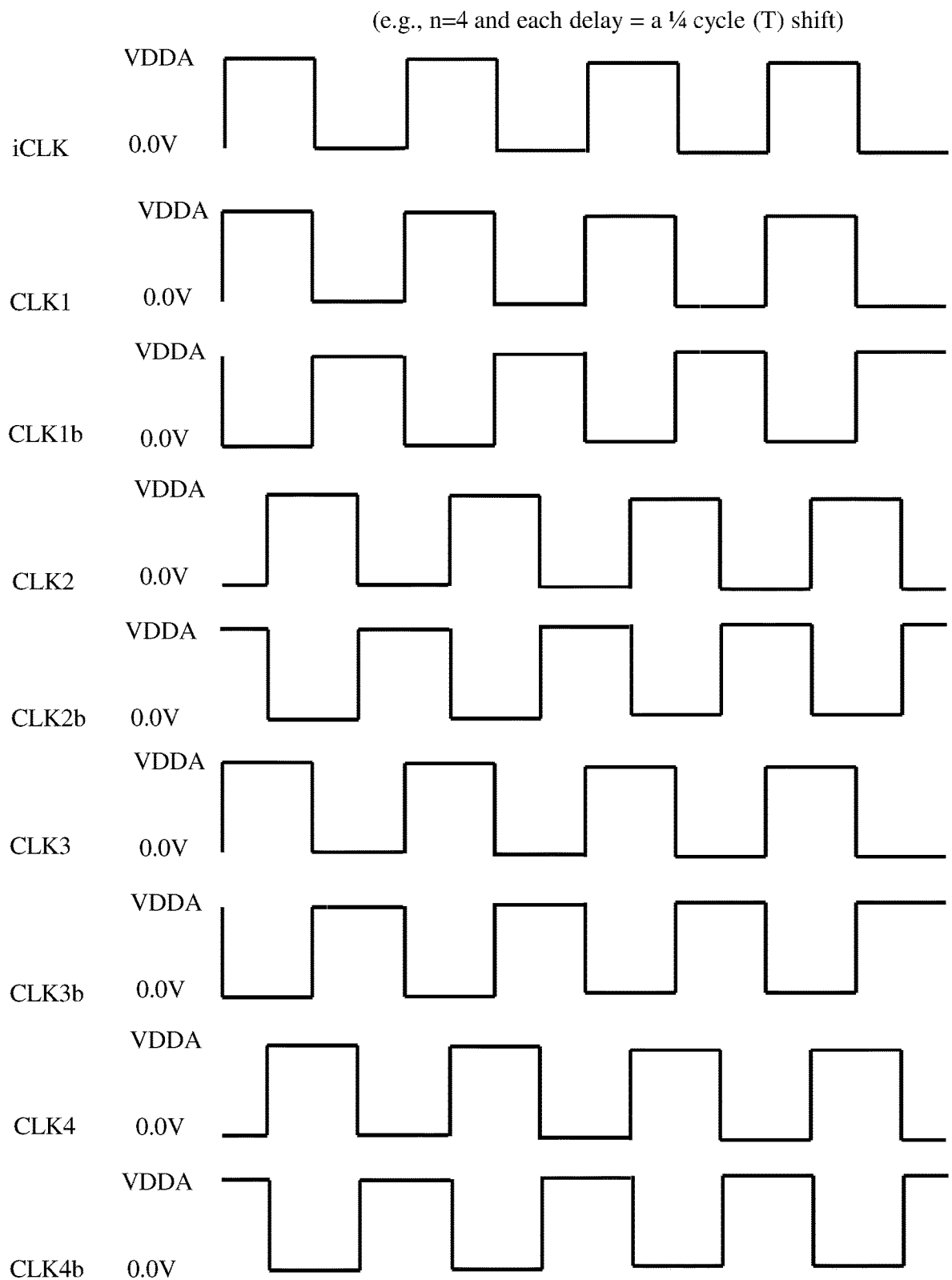
FIG. 3C is a waveform diagram illustrating clock signals generated by the clock generation circuit of FIG. 3A.

In other embodiments (as illustrated in FIGS. 3A-3C and discussed in greater detail below), the combination of delayed and non-delayed pairs of clock signals (each including a clock signal and an inverted clock signal) for controlling charge pump stages 110(1)-110(n) of circuit 100 of FIG. 1 may be somewhat less complex. For example, first CP stage 110(1) can be electrically connected to receive an un-delayed pair of clock signals including a first clock signal (CLK1) at clock signal node 121 and an inverted first clock signal (CLK1b) at clock signal node 122. Second CP stage 110(2) can be electrically connected to receive a delayed pair of clock signals including a second clock signal (CLK2) at clock signal node 121 and an inverted first clock signal (CLK2b) at clock signal node 122. CLK2 and CLK2b can be essentially the same as CLK1 and CLK1b (e.g., same magnitude, same clock period, etc.) but delayed by a specific fraction of one clock period (e.g., by ¼*T). Optionally, if the total number (n) of charge pump stages 110(1)-110(n) in circuit 100 is three or more, some of the charge pump stages (e.g., odd numbered charge pump stages) could be controlled by this same un-delayed pair of clock signals and others (e.g., even numbered charge pump stages) could be controlled by this same delayed pair of clock signals. Optionally, if the total number (n) of charge pump stages 110(1)-110(n) in circuit 100 is an even number, then one half of charge pump stages 110(1)-110(n) (e.g., odd numbered charge pump stages) could be controlled by this same un-delayed pair of clock signals and the other half of the charge pump stages 110(1)-110(n) (e.g., even numbered charge pump stages) could be controlled by this same delayed pair of clock signals.

More particularly, FIG. 2A is a schematic diagram illustrating an example of a clock generation circuit 105A for generating un-delayed and delayed pairs of clocks signals (each including a clock signal and an inverted clock signal) for controlling charge pump stages 110(1)-110(n) of circuit 100 of FIG. 1.

Clock generation circuit 105A can include clock drivers 210(1)-210(n) for charge pump stages 110(1)-110(n), respectively. First clock driver 210(1) can be connected to receive an initial input clock signal (iCLK) and can generate and output an un-delayed pair of first clock signals, including CLK1 and CLK1b, to first charge pump stage 110(1). Second clock driver 210(2) can be connected to receive a first delayed version of iCLK (i.e., iCLK_1D) and can output a delayed pair of second clock signals, including CLK2 and CLK2b, to second charge pump stage 110(2), and so on until the last clock driver. Last clock driver 210(n) can be connected to receive yet another delayed version of iCLK (i.e., iCLK_(n−1) D) and can output a delayed pair of last clock signals, including CLKn and CLKnb, to last charge pump stage 110(n).

To generate the various delayed versions of iCLK, clock generation circuit 105A can include multiple delay elements 220(2)-220(n) for all charge pump stages except the first charge pump stage (i.e., for charge pump stages 110(2)-110(n) only). Delay elements 220(2)-220(n) can, for example, be delay buffers connected in series. Delay element 220(2) can receive iCLK and can output iCLK_1D to both second clock driver 210(2) and delay element 220(3). Delay element 220(3) can receive iCLK_1D and can output iCLK_2D to both a next delay element and a next charge pump stage and so on until delay element 220(n). Delay element 220(n) can receive iCLK_(n−2) D from the next to last delay element 220(n−1) and can output iCLK_(n−1) D to the last charge pump stage 210(n). The delay elements 220(2)-220(n) can be essentially the same such that the amount of delay provided by each is also essentially the same. Thus, for example, if the total number (n) of charge pump stages 110(1)-110(n) in circuit 100 is four, circuit 100 can include three delay element 220(2)-220(4), each of which provide ¼*T delay. As a result, iCLK_1D is delayed by ¼*T relative to iCLK, iCLK_2D is delayed by ½*T relative to iCLK, and iCLK_3D is delayed by ¾*T relative to iCLK. However, if, for example, the total number (n) of charge pump stages 110(1)-110(n) in circuit 100 is eight, circuit 100 can include seven delay elements 220(2)-220(7), each of which provide ¼*T delay. As a result, iCLK_1D is delayed by ¼*T relative to iCLK, iCLK_2D is delayed by ½*T relative to iCLK, and iCLK_3D is delayed by ¾*T relative to iCLK, iCLK_4D is the same as iCLK (i.e., synchronous), iCLK_5D is delayed by ¼*T relative to iCLK, iCLK_6D is delayed by ½*T relative to iCLK, and iCLK_7D is delayed by ¾*T relative to iCLK.

FIG. 2B is a schematic diagram illustrating examples of clock drivers 210(1)-210(n). Each clock driver 210(1)-210(n) can be configured essentially the same. That is, each clock driver 210(1)-210(n) can include, for example, a NAND gate 201, which is electrically connected to a positive power supply at VDDA and further electrically connected to GND (e.g., at 0.0V). NAND gate 201 can receive, as inputs, an input clock signal which swings between 0.0V and VDDA, and an enable signal (EN). The input clock signal received by first clock driver 210(1) can be iCLK and the input clock signals received by the other clock drivers (e.g., 210(2)-210(n) can be iCLK_1D to iCLK_(n−1) D output from delay elements 220(2)-220(n), respectively, as discussed above. In each clock driver 210(1)-210(n), NAND gate 201 can output a given logic value according to a conventional NAND gate truth table. That is, the logic value output by NAND gate 201 will be high (at VDDA) when the following conditions are met: the received input clock signal and EN are both low, the received input clock signal is low and EN is high, and the received input clock signal is high and EN is low. The logic value output by NAND gate 201 will be low (at 0.0 V) when the received input clock signal and EN are both high. In operation, the logic value output by NAND gate 201 can oscillate between GND and VDDA (as a function of the received input clock signal and EN) effectively creating a voltage pulse. For purposes of this disclosure, a "voltage pulse" refers to an essentially rectangular direct current voltage signal that transitions between a low voltage level and a high voltage level at regular and repeated intervals such that the pulse is at the low voltage level for a first time period (t1), switches to the high voltage level and remains at the high voltage level for a second time period (t2) (which is the same as or different from t1), switches back to the low voltage level (completing one clock period (T)) and again remains at the low voltage level for t1, and so on.

Each clock driver 210(1)-210(n) can further include a single inverter 202 (also referred to herein as an inverting buffer) electrically connected to receive the voltage pulse from NAND gate 201. Each clock driver 210(1)-210(n) can further include a pair of series-connected inverters 203-204 (also referred to herein as series-connected inverting buffers) also electrically connected to receive the voltage pulse from NAND gate 201. These inverters 202-204 can each be connected to the positive power supply at VDDA and to GND. In response to the voltage pulse from the NAND gate 201, inverter 202 can output a corresponding clock signal (which transitions between GND and VDDA) and the series-connected inverters 203-204 can output a corresponding inverted clock signal (i.e., when the output clock signal transitions from GND to VDDA, the inverted clock signal transitions from VDDA to GND and vice versa). Given the particular input clock signals received by the clock drivers, respectively, clock driver 210(1) outputs CLK1 (which corresponds to iCLK) and CLK1b, clock driver 210(2) outputs CLK2 (which corresponds iCLK_1D) and CLK2b, and so on with clock driver 210(n) outputting CLKn (which corresponds to CLK_(n−1) D) and CLKnb.

FIG. 2C is a waveform diagram illustrating iCLK, CLK1 and CLK1b, CLK2 and CLK2b, CLK3 and CLK3b, and CLK4 and CLK4b in an example clock generation circuit 105A. In this example, the total number (n) of charge pump stages 110(1)-110(n) in a circuit 100 is four and delay by each delay element 220(2)-220(n) in clock generation circuit 105A is ¼*T.

FIG. 3A is a schematic diagram illustrating another example of a clock generation circuit 105B for generating un-delayed and delayed pairs of clocks signals (each including a clock signal and an inverted clock signal) for controlling charge pump stages 110(1)-110(n) circuit 100 of FIG. 1.

Clock generation circuit 105B can include a first clock driver 310(1) that receives iCLK and outputs an un-delayed pair of clock signals including CLK1 and CLK1b, a delay element 320 that receives iCLK and outputs a delayed version of iCLK (i.e., iCLK_D), and a second clock driver 310(2) that receives iCLK_D and outputs a delayed pair of clock signals including CLK2 and CLK2b.

FIG. 3B is a schematic diagram illustrating examples of the first and second clock drivers 310(1)-310(2) of clock generation circuit 105B. Each clock driver 310(1)-310(2) can be configured essentially the same. That is, each clock driver 310(1)-310(2) can include, for example, a NAND gate 301, which is electrically connected to a positive power supply at VDDA and further electrically connected to GND (e.g., at 0.0V). NAND gate 301 can receive, as inputs, an input clock signal which swings between 0.0V and VDDA, and an enable signal (EN). The input clock signal received by first clock driver 310(1) can be iCLK and the input clock signal received by the second clock driver 310(2) can be iCLK_D output from delay element 320. In each clock driver 310(1)-310(2), NAND gate 301 can output a given logic value according to a conventional NAND gate truth table. That is, the logic value output by NAND gate 301 will be high (at VDDA) when the following conditions are met: the received input clock signal and EN are both low, the received input clock signal is low and EN is high, and the received input clock signal is high and EN is low. The logic value output by NAND gate 301 will be low (at 0.0V) when the received input clock signal and EN are both high. In operation, the logic value output by NAND gate 301 can oscillate between GND and VDDA (as a function of the received input clock signal and EN) effectively creating a voltage pulse. For purposes of this disclosure, a "voltage pulse" refers to an essentially rectangular direct current voltage signal that transitions between a low voltage level and a high voltage level at regular and repeated intervals such that the pulse is at the low voltage level for a first time period (t1), switches to the high voltage level and remains at the high voltage level for a second time period (t2) (which is the same as or different from t1), switches back to the low voltage level (completing one clock period (T)) and again remains at the low voltage level for t1, and so on.

Each clock driver 310(1)-310(2) can further include a single inverter 302 (also referred to herein as an inverting buffer) electrically connected to receive the voltage pulse from NAND gate 301. Each clock driver 310(1)-310(2) can further include a pair of series-connected inverters 303-304 (also referred to herein as series-connected inverting buffers) also electrically connected to receive the voltage pulse from NAND gate 301. These inverters 302-304 can each be connected to the positive power supply at VDDA and to GND. In response to the voltage pulse from the NAND gate 301, inverter 302 can output a corresponding clock signal (which transitions between GND and VDDA) and the series-connected inverters 303-304 can output a corresponding inverted clock signal (i.e., when the output clock signal transitions from GND to VDDA, the inverted clock signal transitions from VDDA to GND and vice versa). Given the particular input clock signals received by the clock drivers, respectively, first clock driver 310(1) outputs CLK1 (which corresponds to iCLK) and CLK1b and second clock driver 210(2) outputs CLK2 (which corresponds iCLK_D) and CLK2b. Optionally, if the total number (n) of charge pump stages 110(1)-110(n) in circuit 100 is three or more, some of the charge pump stages (e.g., odd numbered charge pump stages) could be controlled by this same un-delayed pair of clock signals and others (e.g., even numbered charge pump stages) could be controlled by this same delayed pair of clock signals. Optionally, if the total number (n) of charge pump stages 110(1)-110(n) in circuit 100 is an even number, then one half of charge pump stages 110(1)-110(n) (e.g., odd numbered charge pump stages) could be controlled by this same un-delayed pair of clock signals and the other half of the charge pump stages 110(1)-110(n) (e.g., even numbered charge pump stages) could be controlled by this same delayed pair of clock signals. For example, in circuit 100 with four charge pump stages, the un-delayed pair of clock signals generated and output by the first clock driver 310(1) could be provided to first charge pump stage 110(1) as CLK1 and CLK1b and to third charge pump stage 110(3) as CLK3 and CLK3b, whereas the delayed pair of clock signals generated and output by second clock driver 310(2) could be provided to second charge pump stage 110(2) as CLK2 and CLK2b and to a fourth charge pump stage 110(4) as CLK4 and CLK4b.

FIG. 3C is a waveform diagram illustrating iCLK, CLK1 and CLK1b, CLK2 and CLK2b, CLK3 and CLK3b, and CLK4 and CLK4b in an example clock generation circuit 105B. In this example, the total number (n) of charge pump stages 110(1)-110(n) in a circuit 100 is four and delay by delay element 320 in clock generation circuit 105B is ¼*T. Additionally, the non-delayed pair of clock signals output from first clock driver 310(1) controls the odd numbered charge pump stages 110(1) and 110(3) and the delayed pair of clock signals output from second clock driver 310(2) controls the even numbered charge pump stages 110(2) and 110(4).

Referring again to FIG. 1, in operation, input terminal 184 (and thereby each input node 115 of each charge pump stage 110(1)-110(n)) can receive Vin, which is steady at VDDA. Clock signal nodes 121 and thereby capacitors 113 in all stages 110(1)-110(n) receive corresponding clock signals (CLK1, CLK2, etc.) and clock signal nodes 122 and thereby capacitors 114 in all stages 110(1)-110(n) receive corresponding inverted clock signals (CLK1b, CLK2b, etc.).

In each of these charge pump stages, when the clock signal on clock signal node 122 switches to GND and the inverted clock signal on the clock signal node 121 switches to VDDA, the voltage signal at intermediate node 117 drops to VDDA turning off NFET 112a and turning on PFET 112b and the voltage signal at intermediate node 118 is raised to 2*VDDA turning on NFET 111a and turning off PFET 111b. Contrarily, when the clock signal on the clock signal node 122 switches to VDDA and the inverted clock signal switches on clock signal node 121 switches to GND, the voltage signal at intermediate node 117 rises to 2*VDDA turning on NFET 112a and turning off PFET 112b and the voltage signal at intermediate node 118 drops to VDDA turning off NFET 111a and turning on PFET 111b. As a result, stage-specific output voltages 119(1)-119(n) (Vout1-Voutn) at output nodes 116 of all stages 110(1)-110(n) will all be continuously pulled toward 2*VDDA, regardless of the states, within each stage, of the clock signal on clock signal node 121 and the inverted clock signal on the clock signal node 122. Thus, for example, if VDDA is 1.8V, then the stage-specific output voltages 119(1)-119(n) would be continuously pulled toward 3.6V.

Figure 4:
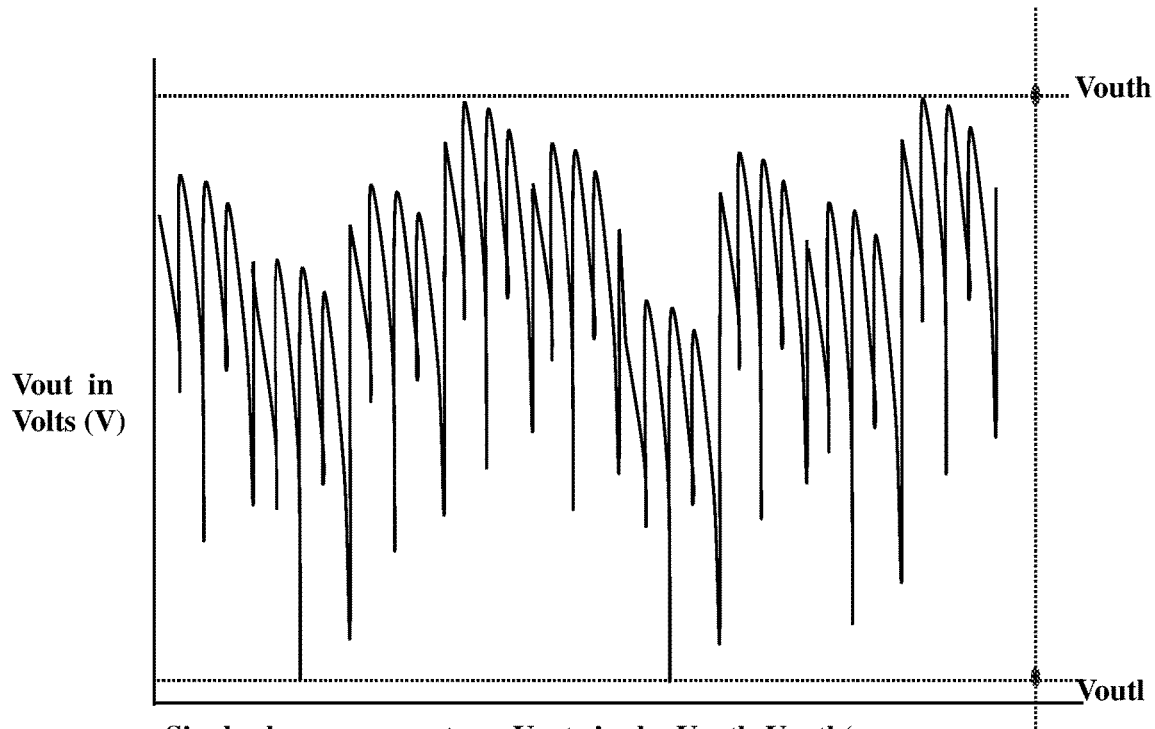
FIG. 4 is a graph illustrating an output voltage of a charge pump circuit with a single charge pump stage.

The ripple of each stage-specific output voltage 119(1)-119(n) (Vout1-Voutn) may be significant. As mentioned above, ripple refers to periodic variation exhibited by a DC voltage. FIG. 4 is a graph illustrating an output voltage (Vout) of a charge pump circuit that includes a set resistive load (RL) 182 (e.g., of 1.6 kilohms (kΩ) for current driving purposes, a set CL 183 (e.g., of 160 picoFarads (pF)), and only a single charge pump stage. As illustrated, ripple may be up to 330 mV or more.

In the disclosed embodiments, ripple of Vout1-Voutn may be similarly large. However, because the charge pump stages 110(1)-110(n) are controlled by a combination of delayed and un-delayed pairs of clock signals and because the output nodes 116 of each charge pump stage 110(1)-110(n) are electrically connected to the same output terminal 185, final output voltage 190 (fVout) at output terminal 185 will exhibit reduced ripple as compared to the stage-specific output voltages 119(1)-119(n) (Vout1-Voutn). Ripple of the fVout 190 refers to the difference between the maximum voltage level exhibited by fVout (i.e., fVouth) and the minimum voltage level exhibited by fVout 190 (i.e., fVout1). Thus, during design of a circuit 100 with multiple charge pump stages 110(1)-110(n) connected in parallel, the total number (n) of charge pump stages 110(1)-110(n), the combination of delayed and un-delayed pairs of clock signals used to control the charge pump stages 110(1)-110(n), and the size of CL 183 can be pre-selected to achieve a desired balance between an acceptable fVout ripple and an acceptable size of circuit 100.

Figure 5:
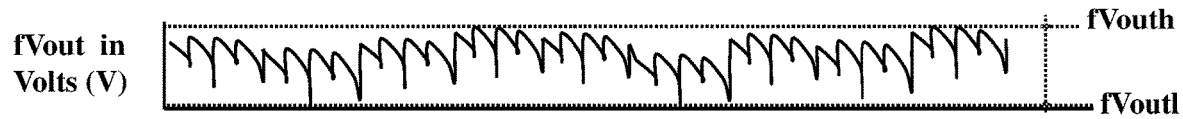
FIG. 5 is a graph illustrating an output voltage of a charge pump circuit with four charge pump stages connected in parallel and, for example, employing a clock generation circuit as in FIG. 2A.
Figure 6:
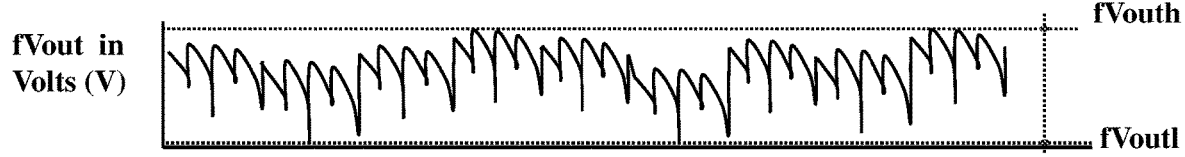
FIG. 6 is a graph illustrating an output voltage of a charge pump circuit with four charge pump stages connected in parallel and, for example, employing a clock signal generation circuit as in FIG. 3A.
Figure 7:
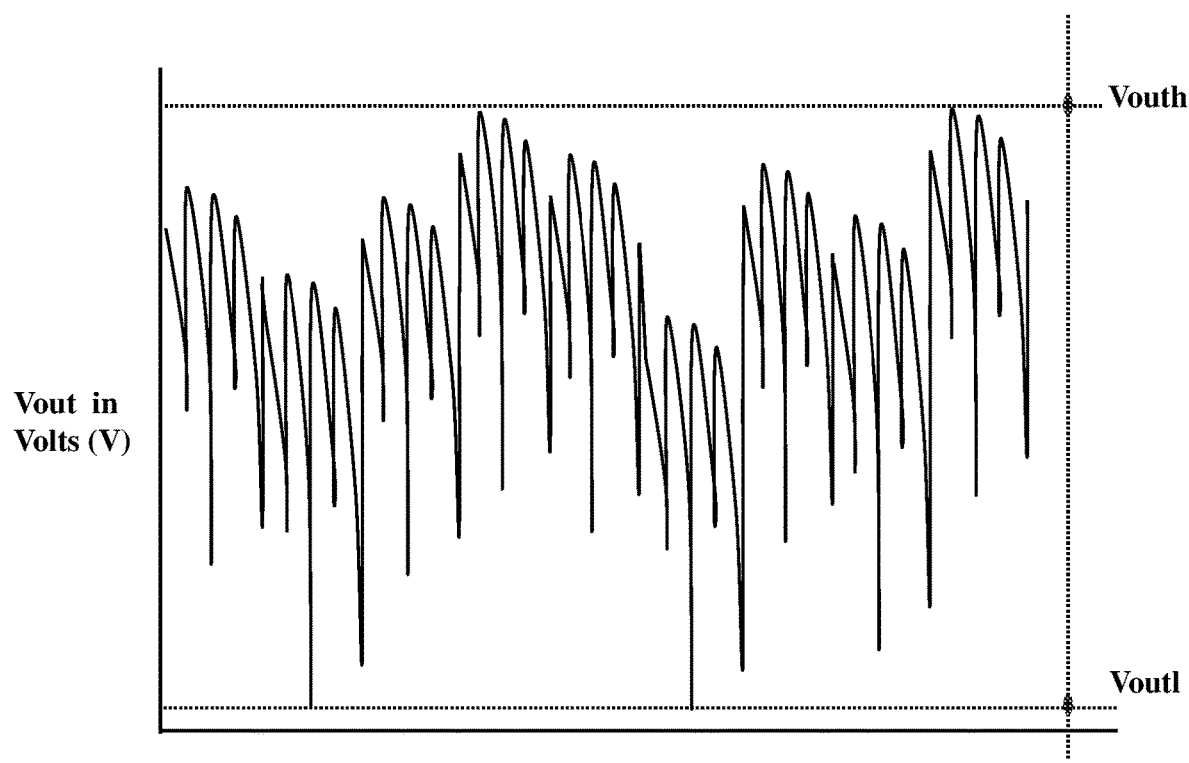
FIG. 7 is a graph illustrating an output voltage of a charge pump circuit with four charge pump stages connected in parallel and, for example, employing a clock signal generation circuit as in FIG. 2A or FIG. 3A and a reduced capacitive load.

FIG. 5 is a graph illustrating fVout 190 (e.g., of approximately 3.0V) in an example circuit 100 with design specifications including a set resistive load (RL) 182 (e.g., of 1.6 kilohms (kΩ)) for current driving purposes, a set CL 183 (e.g., of 160 picoFarads (pF)), four charge pump stages 110(1)-110(4) connected in parallel, and clock signal generation circuit 105A of FIGS. 2A-2B discussed above. As illustrated, in this example, ripple is reduced significantly (e.g., to 25 mV). FIG. 6 is a graph illustrating fVout 190 (e.g., of approximately 3.0V) in another example of circuit 100 with design specifications including the same set resistive load (RL) 182 (e.g., of 1.6 kilohms (kΩ)) for current driving purposes, the same set CL 183 (e.g., of 160 pico-Farads (pF)), four charge pump stages 110(1)-110(4) connected in parallel, and the clock signal generation circuit 105B of FIGS. 3A-3B discussed above. As illustrated, in this example, ripple is also reduced significantly (e.g., to 43 mV) but to a lesser extent. FIG. 7 is a graph illustrating fVout 190 (e.g., of approximately 3.0V) in yet another example circuit 100 with design specifications including the same set resistive load (RL) 182 (e.g., of 1.6 kilohms (kΩ)) for current driving purposes, a significantly reduced CL 183 (e.g., of 16 picoFarads (pF)), four charge pump stages 110(1)-110(4) connected in parallel, and the clock signal generation circuit of 105A of FIGS. 2A-2B or 105B of FIGS. 3A-3B discussed above. As illustrated, in this example, ripple of 330 mv is acceptable. Thus, the multiple charge pump stages 110(1)-110($n$) can be included in circuit 100 so that CL 183 and thereby overall circuit size can be reduced.

In the method and structures described above, a semiconductor material refers to a material whose conducting properties can be altered by doping with an impurity. Exemplary semiconductor materials include, for example, silicon-based semiconductor materials (e.g., silicon, silicon germanium, silicon germanium carbide, silicon carbide, etc.) and III-V compound semiconductors (i.e., compounds obtained by combining group III elements, such as aluminum (Al), gallium (Ga), or indium (In), with group V elements, such as nitrogen (N), phosphorous (P), arsenic (As) or antimony (Sb)) (e.g., GaN, InP, GaAs, or GaP). A pure semiconductor material and, more particularly, a semiconductor material that is not doped with an impurity for the purposes of increasing conductivity (i.e., an undoped semiconductor material) is referred to in the art as an intrinsic semiconductor. A semiconductor material that is doped with an impurity for the purposes of increasing conductivity (i.e., a doped semiconductor material) is referred to in the art as an extrinsic semiconductor and will be more conductive than an intrinsic semiconductor made of the same base material. That is, extrinsic silicon will be more conductive than intrinsic silicon; extrinsic silicon germanium will be more conductive than intrinsic silicon germanium; and so on. Furthermore, it should be understood that different impurities (i.e., different dopants) can be used to achieve different conductivity types (e.g., P-type conductivity and N-type conductivity) and that the dopants may vary depending upon the different semiconductor materials used. For example, a silicon-based semiconductor material (e.g., silicon, silicon germanium, etc.) is typically doped with a Group III dopant, such as boron (B) or indium (In), to achieve P-type conductivity, whereas a silicon-based semiconductor material is typically doped with a Group V dopant, such as arsenic (As), phosphorous (P) or antimony (Sb), to achieve N-type conductivity. A gallium nitride (GaN)-based semiconductor material is typically doped with magnesium (Mg) to achieve P-type conductivity and with silicon (Si) or oxygen to achieve N-type conductivity. Those skilled in the art will also recognize that different conductivity levels will depend upon the relative concentration levels of the dopant(s) in a given semiconductor region.

It should be understood that the terminology used herein is for the purpose of describing the disclosed structures and methods and is not intended to be limiting. For example, as used herein, the singular forms "a," "an," and "the" are intended to include the plural forms as well, unless the context clearly indicates otherwise. Additionally, as used herein, the terms "comprises," "comprising," "includes," and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right," "left," "vertical," "horizontal," "top," "bottom," "upper," "lower," "under," "below," "underlying," "over," "overlying," "parallel," "perpendicular," etc., are intended to describe relative locations as they are oriented and illustrated in the drawings (unless otherwise indicated) and terms such as "touching," "in direct contact," "abutting," "directly adjacent to," "immediately adjacent to," etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various disclosed embodiments have been presented for purposes of illustration but are not intended to be exhaustive or limiting. Many modifications and variations will be apparent to those of ordinary skill in the art without departing from the scope and spirit of the disclosed embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
    an input terminal;
    an output terminal;
    at least two charge pump stages connected in parallel between the input terminal and the output terminal; and
    a clock generation circuit including at least two clock drivers,
    wherein the at least two charge pump stages include a first charge pump stage and a second charge pump stage,
    wherein each of the at least two clock drivers include: a NAND gate; and, connected to an output of the NAND gate, an inverter and a pair of series-connected inverters,
    wherein the at least two clock drivers include a first clock driver and a second clock driver,
    wherein, in the first clock driver, the NAND gate is connected to receive an enable signal and an input clock signal, the inverter outputs a first clock signal, and the pair of series-connected inverters output an inverted first clock signal, wherein, in the second clock driver, the NAND gate is connected to receive the enable signal and a delayed input clock signal, the inverter outputs a second clock signal, and the pair of series-connected inverters output an inverted second clock signal, wherein the first charge pump stage is connected to receive the first clock signal and the inverted first clock signal, wherein the second charge pump stage is connected to receive the second clock signal and the inverted second clock signal, and wherein the second clock signal has a same clock period as the first clock signal and is further delayed relative to the first clock signal.

2. The structure of claim 1, wherein the input terminal is connected to receive an input voltage, wherein each charge pump stage includes:
cross-coupled inverters connected between an input node electrically connected to the input terminal and an output node electrically connected to the output terminal, the cross-coupled inverters having intermediate nodes, respectively, with each intermediate node being at an interconnect between a P-channel field effect transistor (PFET) and an N-channel field effect transistor (NFET) of one of the cross-coupled inverters;
clock signal nodes connected to receive corresponding clock and inverted clock signals, respectively; and
capacitors connected between the clock signal nodes and the intermediate nodes, and wherein the capacitors in all of the charge pump stages are equal-size capacitors.

3. The structure of claim 2, wherein the clock generation circuit further includes at least:

a delay element connected to receive the input clock signal, wherein the delay element outputs the delayed input clock signal.

4. The structure of claim 1, wherein the output terminal is connected to a capacitive load.

5. The structure of claim 1, wherein the output terminal is connected to a resistive load.

6. A structure comprising:
an input terminal;
an output terminal;
charge pump stages connected in parallel between the input terminal and the output terminal,
a clock generation circuit including clock drivers for the charge pump stages, respectively,
wherein the charge pump stages include at least three charge pumps including at least a first charge pump stage, a second charge pump stage, and a last charge pump stage,
wherein each clock driver includes: a NAND gate; and, connected to an output of the NAND gate, an inverter and a pair of series-connected inverters,
wherein the clock drivers include at least a first clock driver, a second clock driver, and a last clock driver,
wherein, in the first clock driver, the NAND gate is connected to receive an enable signal and an input clock signal, the inverter outputs a first clock signal, and the pair of series-connected inverters output an inverted first clock signal, wherein, in the second clock driver, the NAND gate is connected to receive the enable signal and a delayed input clock signal, the inverter outputs a second clock signal, and the pair of series-connected inverters output an inverted second clock signal, wherein, in the last clock driver, the NAND gate is connected to receive the enable signal and a further delayed input clock signal, the inverter outputs a last clock signal, and the pair of series-connected inverters output an inverted last clock signal, wherein the first charge pump stage is connected to receive the first clock signal and the inverted first clock signal, wherein the second charge pump stage is connected to receive the second clock signal and the inverted second clock signal, and wherein each additional charge pump stage up to and including the last charge pump stage are connected to receive progressively delayed clock and inverted clock signals with a same clock period as the first clock signal.

7. The structure of claim 6, wherein the progressively delayed clock and inverted clock signals are delayed by a fraction of one clock period.

8. The structure of claim 6, wherein a total number (n) of the charge pump stages is a multiple of four and wherein the progressively delayed clock and inverted clock signals are delayed by one quarter of one clock period.

9. The structure of claim 6, wherein a total number (n) of the charge pump stages is a multiple of ten and wherein the progressively delayed clock and inverted clock signals are delayed by one tenth of one clock period.

10. The structure of claim 6, wherein the input terminal is connected to receive an input voltage, and wherein each charge pump stage includes:
cross-coupled inverters connected between an input node electrically connected to the input terminal and an output node electrically connected to the output terminal, the cross-coupled inverters having intermediate nodes, respectively, with each intermediate node being at an interconnect between a P-channel field effect transistor (PFET) and an N-channel field effect transistor (NFET) of one of the cross-coupled inverters;
clock signal nodes connected to receive corresponding clock and inverted clock signals, respectively; and
capacitors connected between the clock signal nodes and the intermediate nodes.

11. The structure of claim 10, wherein the capacitors in the charge pump stages are equal-size capacitors.

12. The structure of claim 10, wherein the clock generation circuit further includes:

delay elements connected to all clock drivers except a first clock driver connected to the first charge pump stage, wherein the delay elements output delayed versions of the input clock signal.

13. The structure of claim 6, wherein the output terminal is connected to a capacitive load.

14. The structure of claim 6, wherein the output terminal is connected to a resistive load.

15. A structure comprising:
an input terminal;
an output terminal; and
charge pump stages connected in parallel between the input terminal and the output terminal, wherein one half of the charge pump stages are connected to receive a first clock signal and an inverted first clock signal, wherein another half of the charge pump stages are connected to receive a second clock signal and an inverted second clock signal, wherein the second clock signal has a same clock period as the first clock signal and is further delayed relative to the first clock signal, and wherein a total number (n) of the charge pump stages is a multiple of four and wherein the second clock signal is delayed by one quarter of one clock period.

16. The structure of claim 15, wherein the input terminal is connected to receive an input voltage, wherein each charge pump stage includes:
cross-coupled inverters connected between an input node electrically connected to the input terminal and an output node electrically connected to the output terminal, the cross-coupled inverters having intermediate nodes, respectively, with each intermediate node being at an interconnect between a P-channel field effect transistor (PFET) and an N-channel field effect transistor (NFET) of one of the cross-coupled inverters;
clock signal nodes connected to receive corresponding clock and inverted clock signals, respectively; and
capacitors connected between the clock signal nodes and the intermediate nodes, and wherein the capacitors in the charge pump stages are equal-size capacitors.

17. The structure of claim 16, further comprising a clock generation circuit including:
a first clock driver connected to receive an input clock signal, wherein the first clock driver outputs the first clock signal and the inverted first clock signal;
a delay element connected to receive the input clock signal, wherein the delay element outputs a delayed input clock signal; and
a second clock driver connected to receive the delayed input clock signal, wherein the second clock driver outputs the second clock signal and the inverted second clock signal.

18. The structure of claim 15, wherein the output terminal is connected to a capacitive load.

19. The structure of claim 15, wherein the output terminal is connected to a resistive load.

* * * * *